(12) United States Patent
Lafleur et al.

(10) Patent No.: US 11,677,144 B1
(45) Date of Patent: Jun. 13, 2023

(54) MULTIPLE BEAM PHASED ARRAY ANTENNA SYSTEM FOR MOBILE SATELLITE COMMUNICATIONS

(71) Applicant: ORBCOMM, INC., Rochelle Park, NJ (US)

(72) Inventors: Phil Lafleur, Kanata (CA); Vadim Volinski, Ottawa (CA)

(73) Assignee: ORBCOMM INC., Rochelle Park, NJ (US)

( * ) Notice: Subject to any disclaimer, the term of this patent is extended or adjusted under 35 U.S.C. 154(b) by 0 days.

(21) Appl. No.: 16/453,973

(22) Filed: Jun. 26, 2019

Related U.S. Application Data

(60) Provisional application No. 62/690,303, filed on Jun. 26, 2018.

(51) Int. Cl.
| | |
|---|---|
| *H01Q 1/18* | (2006.01) |
| *H01Q 21/20* | (2006.01) |
| *H01Q 1/16* | (2006.01) |
| *H01Q 3/24* | (2006.01) |
| *H04B 7/155* | (2006.01) |
| *H01Q 21/26* | (2006.01) |

(52) U.S. Cl.
CPC ............... *H01Q 3/24* (2013.01); *H01Q 1/16* (2013.01); *H01Q 1/18* (2013.01); *H01Q 21/205* (2013.01); *H01Q 21/26* (2013.01); *H04B 7/15528* (2013.01)

(58) Field of Classification Search
CPC .. H01Q 9/0407; H01Q 9/0435; H01Q 9/0457; H01Q 1/38; H01Q 1/16; H01Q 1/18; H01Q 21/205; H01Q 21/26; H01Q 1/12; H01Q 1/28; H01Q 9/045
See application file for complete search history.

(56) References Cited

U.S. PATENT DOCUMENTS

| | | | |
|---|---|---|---|
| 2009/0027260 A1* | 1/2009 | Runyon | H04B 7/18515 342/352 |
| 2010/0001910 A1* | 1/2010 | Kawaguchi | H01Q 21/28 343/711 |
| 2015/0365955 A1* | 12/2015 | Liu | H04W 52/16 370/329 |
| 2016/0261039 A1* | 9/2016 | Parsche | H01Q 9/0457 |
| 2018/0034139 A1* | 2/2018 | Kaneko | H01Q 1/325 |

\* cited by examiner

*Primary Examiner* — Ricardo I Magallanes

(57) ABSTRACT

The present invention provides an antenna array which includes a structure in the form of a hexagonal pyramid with a flat top surface/facet. According to preferred aspects, the pedestal support of the present invention preferably further includes six side facets which are preferably disposed 60 degrees from each other. Preferably, each side facet preferably supports a patch antenna and the top facet supports a top/zenith antenna. According to a preferred embodiment, the azimuth antennas may be offset from the ground plane by an angle between 20 and 60 degrees. The zenith antenna is preferably substantially parallel to the ground plane.

19 Claims, 13 Drawing Sheets

MULTIPLE BEAM PHASED ARRAY ANTENNA SYSTEM FOR MOBILE SATELLITE COMMUNICATIONS

BACKGROUND OF THE PRESENT INVENTION

1. Field of the Present Invention

The present invention relates generally to a satellite communications system and, more particularly, to a multiple beam phased array antenna system for mobile satellite communications.

2. Description of Related Art

Mobile satellite service (MSS) provides connectivity in areas underserved by terrestrial mobile communications infrastructure. Land mobile-satellite service (LMSS) fills the terrestrial coverage gaps, typically in sparsely populated areas and maritime mobile-satellite service (MMSS) is used outside of coastal areas.

While low data rate services are ideal for mobile asset tracking and monitoring applications, more advanced internet protocol (IP) based services require higher data rates. Unlike high-speed fixed satellite services (FSS) where high-gain, narrow-beam antenna earth stations are commonplace, MSS earth stations are often lower gain and operate at lower data rates. For example, Inmarsat's Broadband Global Area Network (BGAN) offers IP connectivity with antenna gains as low as 8 dBic and data rates in the range of 10s to 100s kbps.

MSS earth stations also typically include global navigation satellite system (GNSS) functionality for accurate positioning. GNSS antennas are ideally low directivity to track as many medium earth orbit (MEO) satellites as possible. Both GNSS and MSS systems use circular polarization to mitigate polarization losses, and in the case of BGAN and most GNSS systems, right-hand circular polarization is used.

The use of satellite networks such as Inmarsat's BGAN for IP connectivity has significant disadvantages. First, BGAN latency is higher than competing low earth orbit (LEO) systems due to the signal transit time to geosynchronous earth orbit (GEO). To minimize latency and maximize throughput, BGAN is a full-duplex system. Further, some latency can be offset by the high network availability due to the satellite being continuously in view.

On land, LMSS link budgets are further limited by a combination of the satellite beam contours and the elevation angle coverage of the mobile earth station. For example, an LMSS earth station targeted at populated areas typically requires coverage at elevation angles above 20°, whereas a system designed to operate well into the arctic may require coverage at elevation angles above 5°. The same is true for MMSS systems except that the MMSS earth station's host ship's pitch (typically up to 10°) and roll (typically up to 30°) may tilt the earth station away from the satellite. To counter this impairment, MMSS earth stations typically require coverage down to negative elevation angles (below the horizon). This is possible because MMSS earth stations are typically pole-mounted, with a clear line-of-sight even at angles below the horizon.

In contrast, roof-mounted LMSS earth stations have restrictions on height to avoid vertical clearance issues on the road. They also are typically mounted to a large conductive surface (ground plane) which can limit low elevation angle antenna performance, particularly the horizontal polarization. The environment around the mobile earth station, particularly the presence and installed height above a ground plane, can have a significant impact on antenna radiation patterns. This is particularly true for low gain, wide beam antennas and has to be taken into account to synthesize a desired transmit power level.

With the explosive growth of IP-based terrestrial mobile communications infrastructure, LMSS maintains a market niche for critical applications in underserved areas. MMSS remains the only means for connectivity away from the coast. Adoption of both LMSS and MMSS is limited by the high cost of each earth station, which typically must include a mechanically-steered and gimbal/gyro stabilized tracking antenna.

Phased array systems can greatly assist in providing IP-based satellite communications. Phased array antennas offer much finer beam control than multiple beam array antennas, virtually eliminating scalloping loss, but the electronics required contributes to beam forming losses, reducing antenna gain and contributing to antenna noise temperature. Beam switching and beam forming losses are a principal challenge faced by the mobile earth station designer. Further, losses between the power amplification subsystems and the antenna array elements, such as beam switching and beam forming losses, are costly because they necessitate a more powerful power amplifier to compensate for the reduced effective isotropic radiated power (EIRP), leading to higher costs, increased power consumption and increased heat dissipation.

Additionally, losses between low noise amplification subsystems and the antenna array elements, such as beam switching and beam forming losses have a double effect, decreasing gain while increasing noise temperature. These losses cannot be compensated for other than to redesign the mobile earth station antenna to increase gain, because the received power level is fixed by the satellite system itself. As a result, gain to noise temperature ratios (G/T) are typically a limiting factor that determine antenna gain requirements.

Due to each of factors discussed above, providing IP services over satellite networks has remained very expensive and underutilized. There is therefore a need for a low-cost, compact BGAN earth station, without mechanical steering, capable of meeting LMSS and MMSS coverage requirements.

DESCRIPTION OF THE PREFERRED EMBODIMENTS

Figure 1:
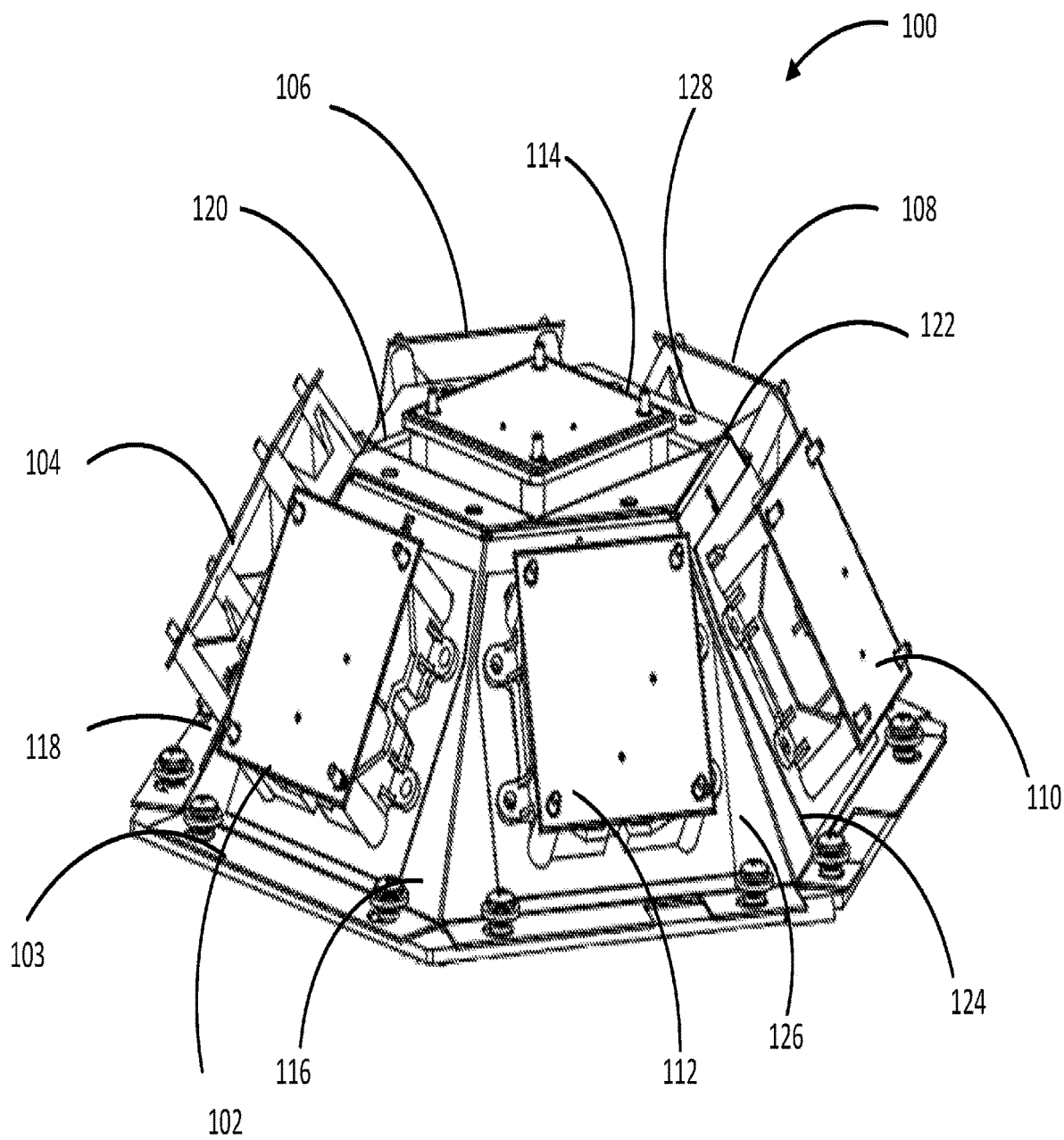
FIG. 1 shows a diagram of an antenna system in accordance with a first preferred embodiment of the present invention.

For the purposes of promoting an understanding of the principles of the present invention, reference will now be made to the embodiments illustrated in the drawings and specific language will be used to describe the same. It will nevertheless be understood that no limitation of the scope of the present invention is hereby intended and such alterations and further modifications in the illustrated devices are contemplated as would normally occur to one skilled in the art.

The terms "program," "computer program," "software application," "module" and the like as used herein, are defined as a sequence of instructions designed for execution on a computer system. A program, computer program, module or software application may include a subroutine, a function, a procedure, an object implementation, an executable application, an applet, a servlet, a source code, an object code, a shared library, a dynamic link library and/or other sequence of instructions designed for execution on a computer system. A data storage means, as defined herein, includes many different types of computer readable media that allow a computer to read data therefrom and that maintain the data stored to allow the computer to be able to read the data again. Such data storage means can include, for example, non-volatile memory, such as ROM, Flash memory, battery backed-up RAM, Disk drive memory, CD-ROM, DVD, and other permanent storage media. However, even volatile storage such a RAM, buffers, cache memory, and network circuits are contemplated to serve as such data storage means according to different embodiments of the present invention.

Aspects of the systems and methods described herein may be implemented as functionality programmed into any of a variety of circuitry, including programmable logic devices (PLDs), such as field programmable gate arrays (FPGAs), programmable array logic (PAL) devices, electrically programmable logic and memory devices and standard cell-based devices, as well as application specific integrated circuits (ASICs). Some other possibilities for implementing aspects of the systems and methods include: microcontrollers with memory, embedded microprocessors, firmware, software, etc. Furthermore, aspects of the systems and methods may be embodied in microprocessors having software-based circuit emulation, discrete logic (sequential and combinatorial), custom devices, fuzzy (neutral network) logic, quantum devices, and hybrids of any of the above device types. Of course, the underlying device technologies may be provided in a variety of component types, e.g., metal-oxide semiconductor field-effect transistor (MOSFET) technologies like complementary metal-oxide semiconductor (CMOS), bipolar technologies like emitter-coupled logic (ECL), polymer technologies (e.g., silicon-conjugated polymer and metal-conjugated polymer-metal structure), mixed analog and digital, and the like.

All dimensions as shown in the figures and described in the specification have been selected to simplify explanations. The present invention may use any wired or wireless protocols for communicating between elements, including for instance: Wi-Fi, 3G, 4G, CDMA, TDMA, OSM, Ethernet, Bluetooth, Zigbee, MIMO and/or any other standards based or proprietary protocols capable of transmitting data. Further, although the present invention is discussed primarily with respect to the INMARSAT BGAN satellite network, the present invention may be used to communicate with any satellite. For example, the present invention may work with satellite transceivers operating at any band, including but not limited to: C-band, L-Band or S-Band.

With reference now to FIG. 1, a diagram of an antenna system 100 in accordance with a first preferred embodiment of the present invention is shown. As shown, a preferred embodiment of the present invention preferably includes a pedestal structure 103 in the form of a hexagonal pyramid with a flat top surface/facet 128. As further shown, the pedestal support 103 preferably further includes six side facets 116, 118, 120, 122, 124 and 126 which are preferably disposed 60 degrees from each other. As further shown, each facet preferably supports a patch antenna 102, 104, 106, 108, 110, 112 and 114 orientated as discussed further below. Preferably, the pedestal structure 103 is formed of metal such as aluminum to allow the pedestal structure 103 to act as ground plane for each supported antenna. Accordingly, the antenna pedestal structure 103 preferably serves as both a ground plane structure and as a shield for the integrated antenna structure. Preferably, the pedestal structure 103 may be covered by a radome (not shown) to protect the internal components of the antenna array.

Figure 2:
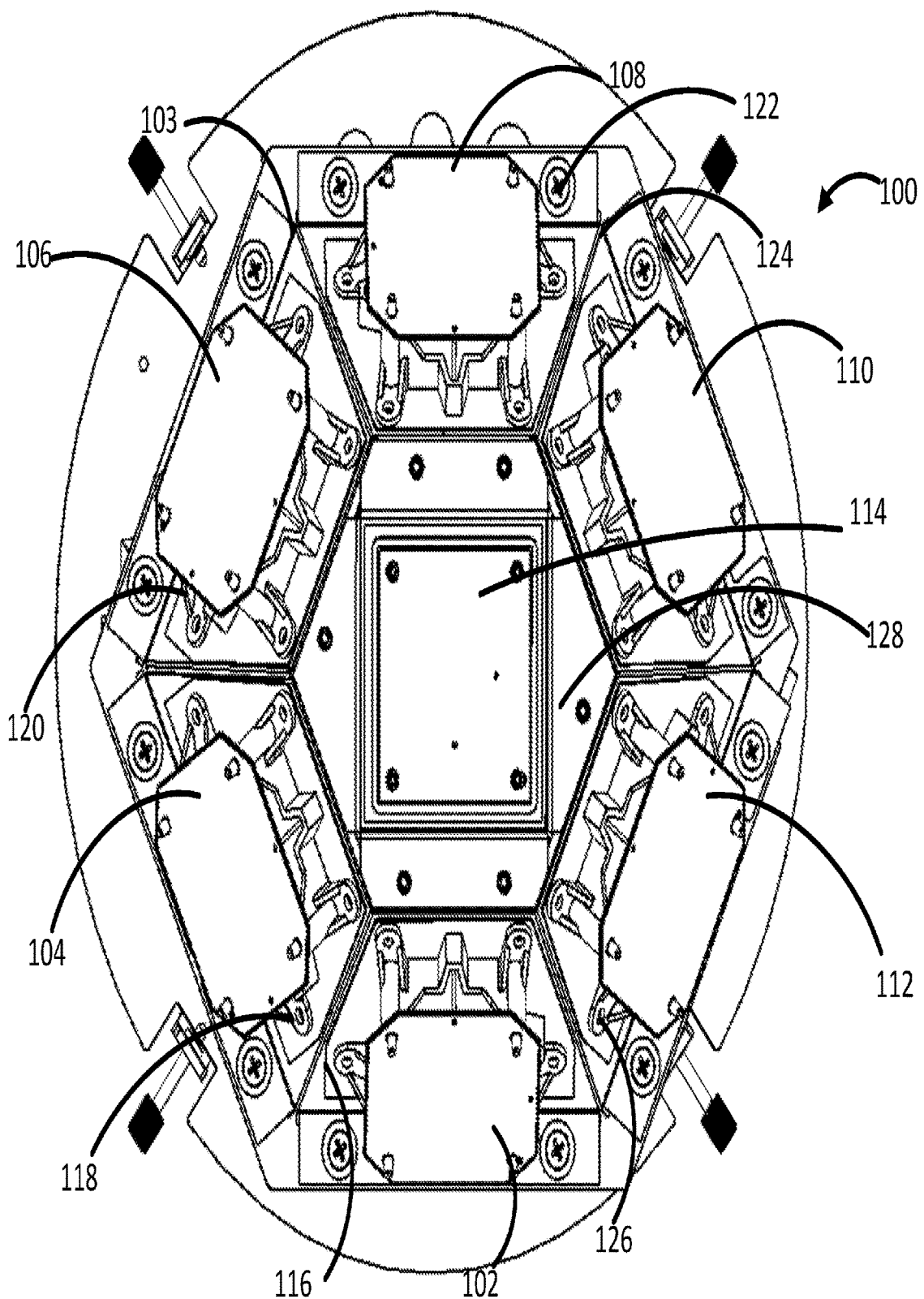
FIG. 2 shows an overhead view of the exemplary antenna array shown in FIG. 1.

With reference now to FIG. 2, an overhead view of the exemplary antenna array 100 is shown. As shown in FIG. 1, the antenna array 100 includes patch antennas 102, 104, 106, 108, 110, 112, 114 which are arranged with six azimuth antennas on the sides and one zenith antenna on top. As shown, each patch antenna 102, 104, 106, 108, 110, 112, 114 is attached to a respective facet 116, 118, 120, 122, 124, 126 and 128 as discussed further below. Preferably, the six azimuth antennas 102, 104, 106, 108, 110, 112 are preferably inclined at an angle with respect to the ground plane. According to a preferred embodiment, the azimuth antennas may be offset from the ground plane by an angle between 20 and 60 degrees including angles of 20, 25, 30, 35, 40, 45, 50, 55 or 60 degrees. The zenith antenna 114 on the top surface 128 is preferably not tilted. According to further preferred embodiments, the zenith antenna 114 may preferably further serve as a GNSS antenna. In the primary embodiment, GLONASS frequency bands cannot be received due to incompatibility with BGAN diplexer passbands. However, the present invention may alternatively be designed to include diplexers to receive and work with all geo-location bands. As discussed herein, the exemplary architecture of the present system is not intended to be limiting.

Figure 3A:
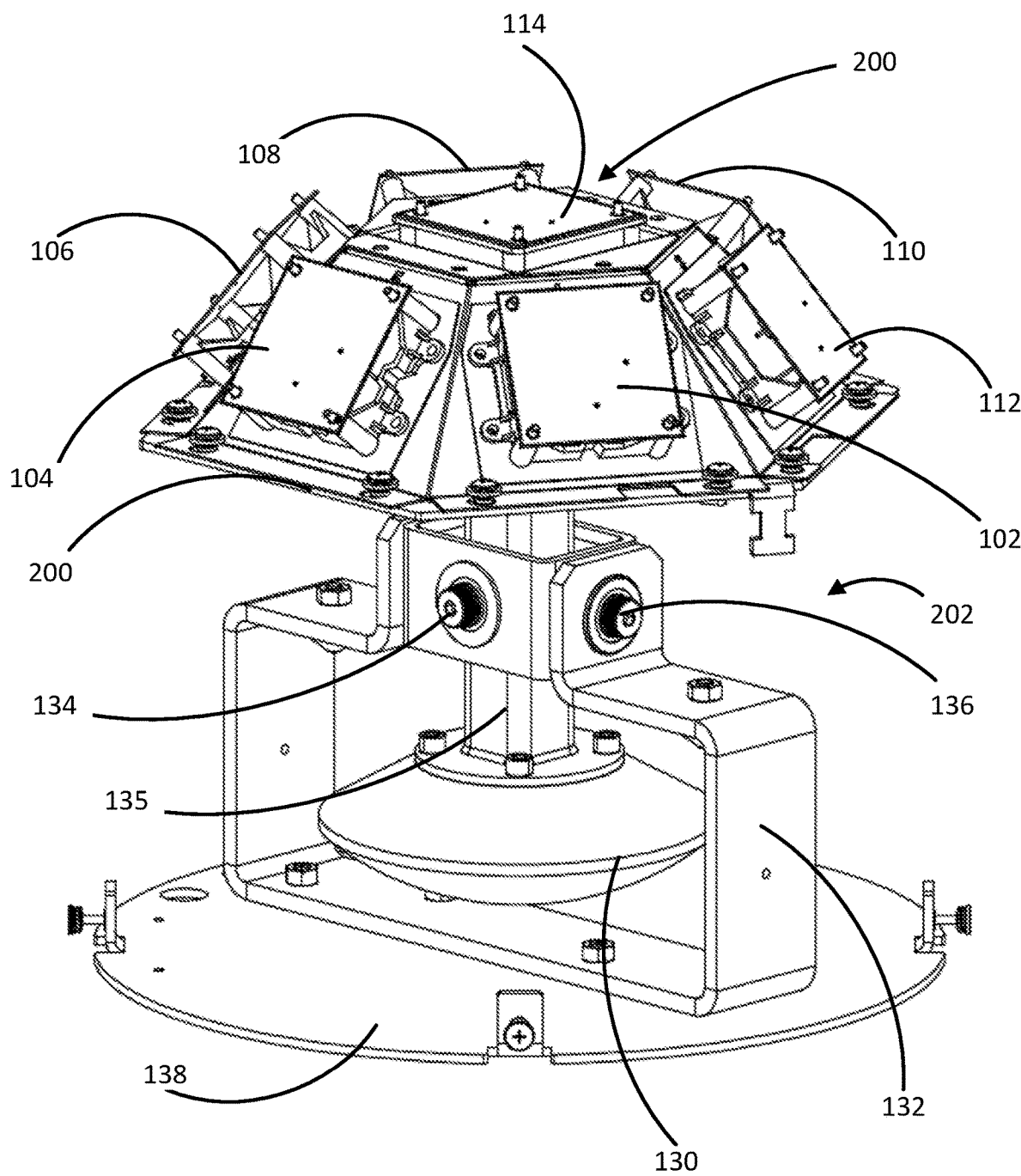
FIG. 3A shows a perspective view of an exemplary antenna array in accordance with the present invention.
Figure 3B:
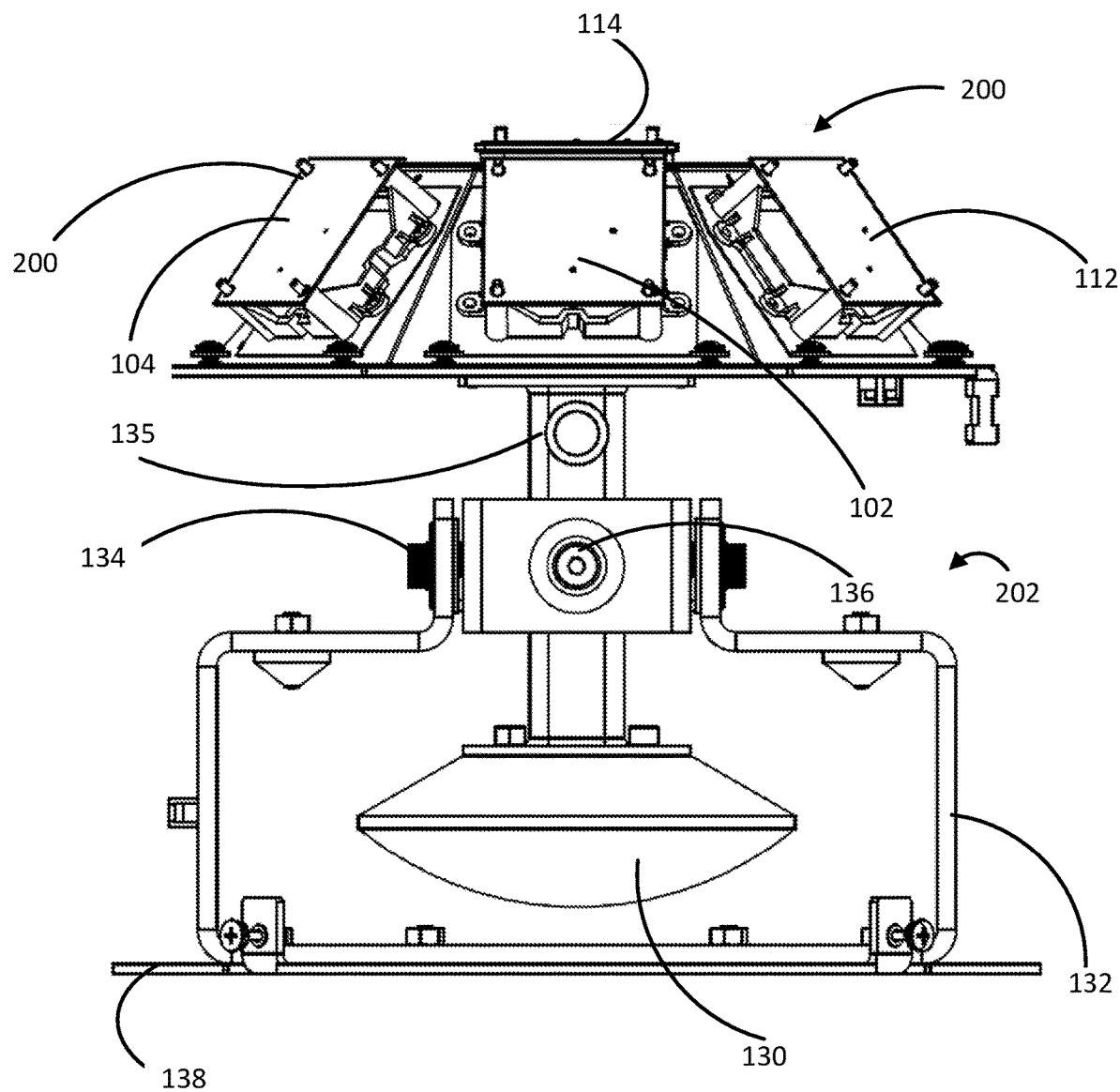
FIG. 3B shows a perspective view of an exemplary antenna array of the present invention attached to a stabilization system.

As shown in FIGS. 3A and 3B, the antenna array 200 of the present invention may be attached to a stabilization system 202 to allow for maritime uses and the like. As shown, the stabilization system 202 may preferably be attached to the bottom of the antenna array 200 using a support column 135 which may preferably be further attached to a ballast/counter-weight 130. As further shown, the stabilization system 202 may preferably further include a stabilization platform 132 which incorporates a gimbal system including a first bearing 134 which may compensate for changes in the pitch of a given vessel; and a second bearing 136 which may compensate for changes in the roll of a given vessel. Further, the stabilization system 202 preferably further includes a securing plate 138 for attachment to a vessel. In use, the stabilization system 202 elevates the antenna array 200 above the ground plane thus allowing better low elevation angle performance. Further, the gimbal of the present invention preferably moves to counter any movement (i.e. yaw, pitch, roll) which changes the level of the antenna array. The leveling of the gimbal system reduces the need for the antenna array of the present invention to consider negative look angles (i.e. elevation angle+ship inclination<0°) as is usually required in marine environments. In the present invention, the ship inclination is eliminated by the gimbal. Further, the use of the gimbal platform of the present invention allows for a common antenna array to be used in both land and maritime applications.

Figure 4A:
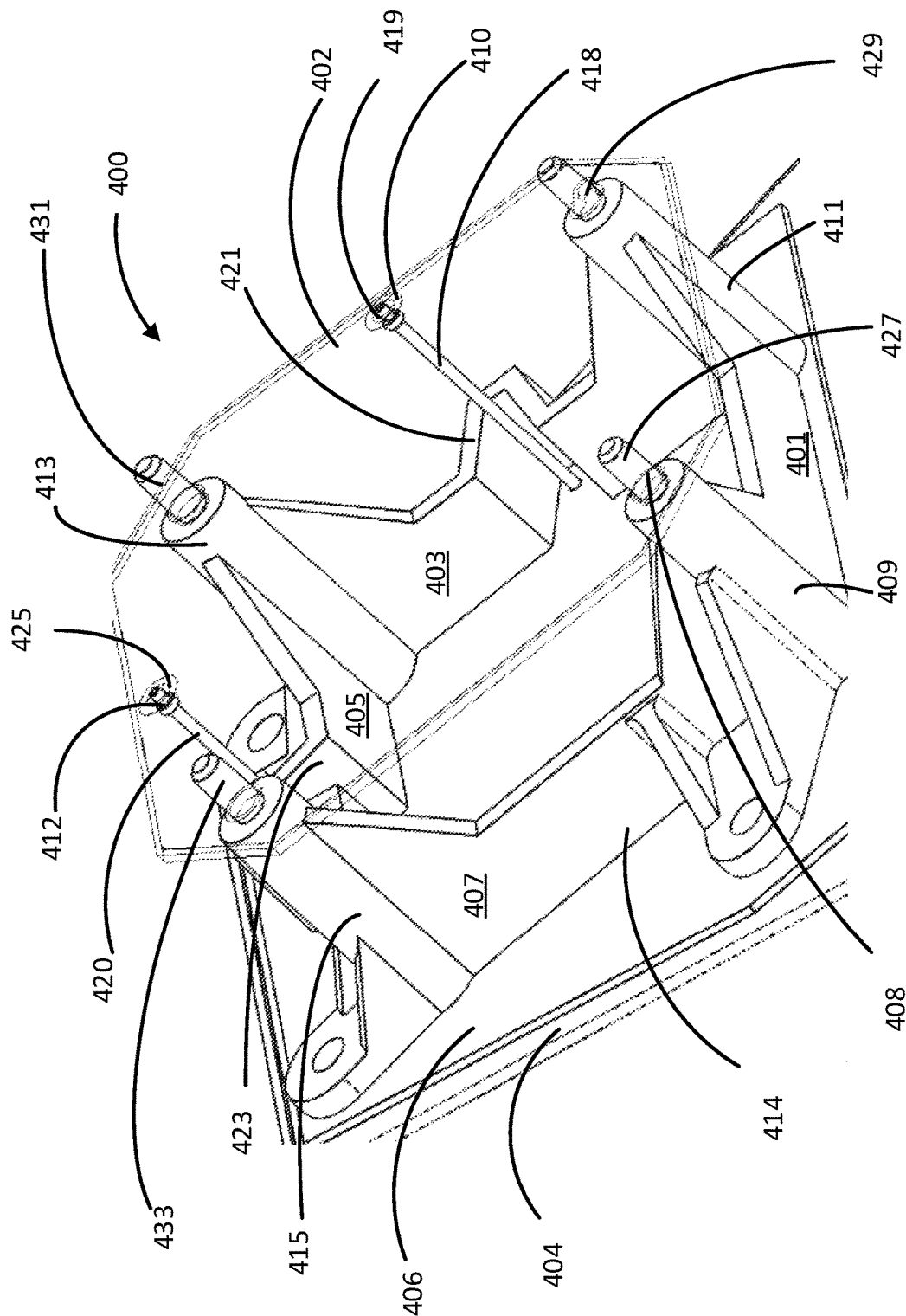
FIG. 4A shows a perspective view of an azimuth antenna assembly in accordance with one aspect of the present invention.
Figure 4B:
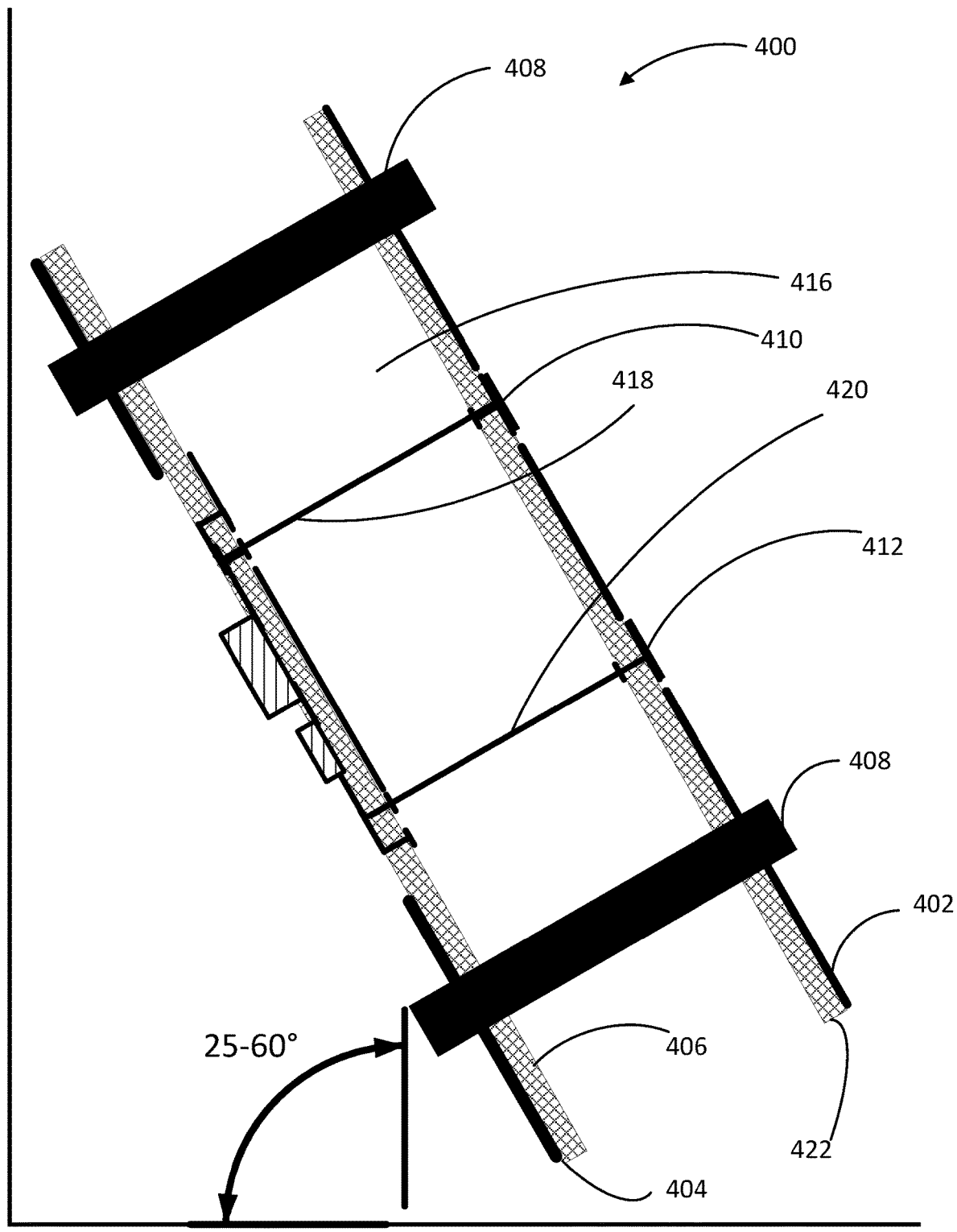
FIG. 4B shows a cut-way view of an exemplary azimuth antenna assembly in accordance with the present invention.

With reference now to FIGS. 4A and 4B, an exemplary azimuth antenna assembly 400 shall now be discussed. As shown in FIG. 4A, an exemplary azimuth antenna assembly 400 of the present invention may include a patch antenna 402 secured to a facet 404 using an elevating platform 414. As shown, the patch antenna 402 is preferably connected with non-conducting supports 408. To partially control impedance matching, the azimuth antenna assembly 400 may preferably further include one or more gap capacitors 410, 412. Other types of discrete capacitors may be used as well without limitation.

With reference now to FIG. 4B, a cut-away view of the exemplary azimuth antenna assembly 400 is provided. As shown, the exemplary patch antenna 402 is connected to the facet 404 via non-conductive supports 408. As shown, the patch antenna 402 is preferably attached to an insulating material 422 which may preferably be any dielectric material such as PCB substrate or the like. According to a preferred embodiment, each patch antenna is preferably elevated above the surface of the pedestal support 103 which acts as the ground reference for the patch antenna. Further to the insulating material 422, each patch antenna assembly 400 preferably includes a dielectric layer 416 which is mostly air for reasons of increased bandwidth and higher directivity.

According to a preferred embodiment, the patch antenna 402 is preferably formed of copper or another conductive material. To partially control impedance matching, the azimuth antenna assembly 400 preferably further includes one or more gap capacitors 410, 412 which are attached to one or more feed pins 418, 420. As further shown, the feed pins 418, 420 are connected to the facet PCB 406 and the facet PCB ground plane is electrically connected to the pedestal facet 404 to maintain shielding integrity.

With further reference to FIG. 4A, the patch antenna 402 is shown secured to a facet 404 using an elevating platform 414. The elevating platform 414 may preferably be attached to the patch facet PCB 406 or another insulating surface. According to a preferred embodiment, the elevating platform 414 may preferably include a first support column 409, a second support column 411, a third support column 413, and a fourth support column 415. Preferably, a first wall 401 may extend between the first support column 409 and the second support column 411. Likewise, a second wall 403 may extend between the second support column 411 and the third support column 413; a third wall 405 may extend between the third support column 413 and the fourth support column 415; and a fourth wall 407 may extend between the fourth support column 415 and the first support column 409. As shown, each support column 409, 411, 413, 415 may preferably include a support extension (as shown respectively 427, 429, 431, 433) which may preferably extend from each support column 409-415 and through the first patch antenna 402.

As discussed further below, the patch antenna 402 preferably also includes a first gap capacitor feed pin 418, and a second gap capacitor feed pin 420. Each feed pin 418, 420 preferably extends vertically to support respective gap capacitors 410, 412. Each respective gap capacitor 410, 412 preferably includes a top plate 419, 425 which extends to a set diameter within a larger capacitor gap. As further shown, the feed pins 418, 420 may preferably be located within respective feed pin convexities 421, 423. According to a preferred embodiment, the feed pin convexities 421, 423 may preferably be formed within one or more of the elevating platform walls 401-407 as shown.

Figure 5:
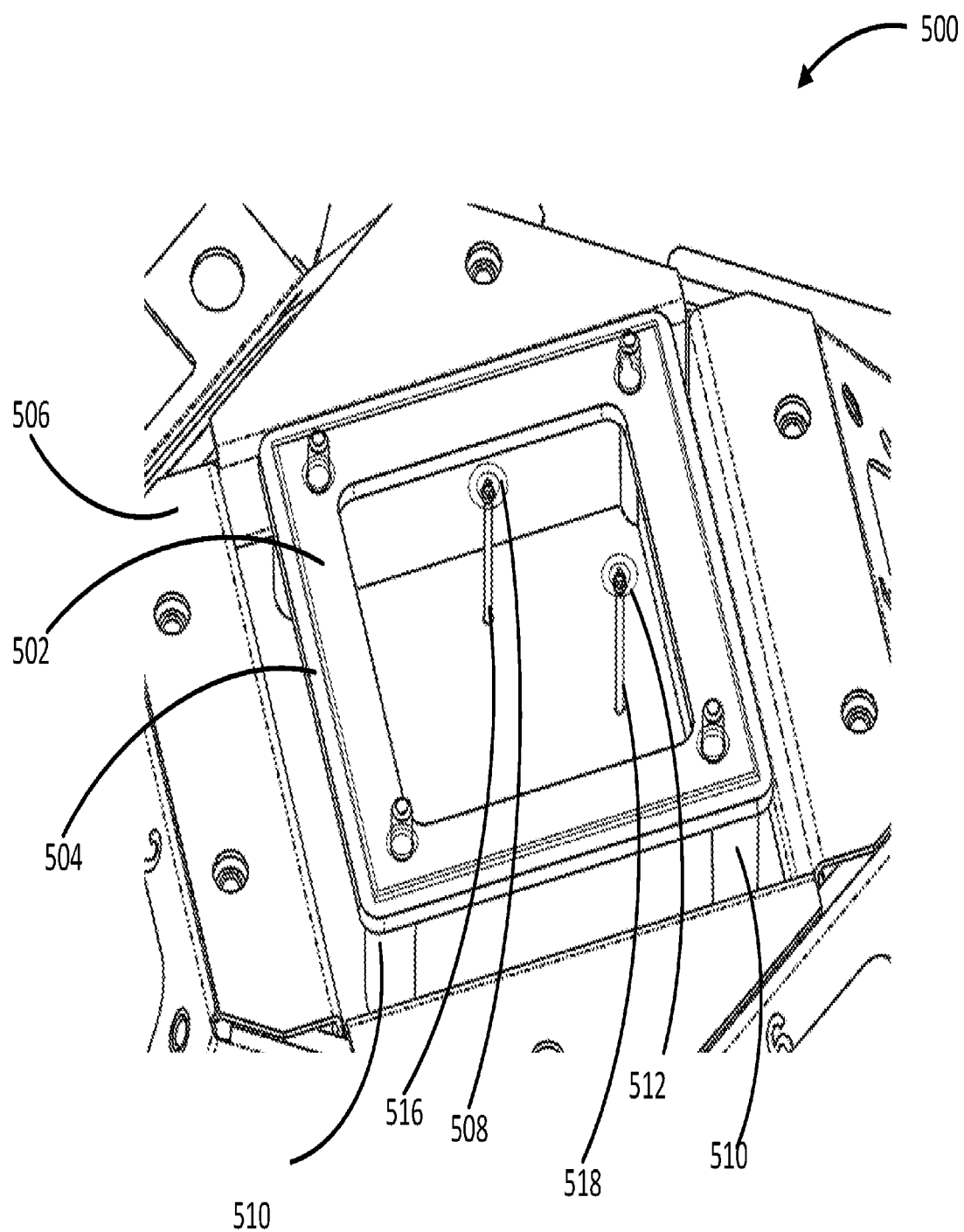
FIG. 5 shows a perspective view of a zenith antenna assembly in accordance with one aspect of the present invention.
Figure 6:
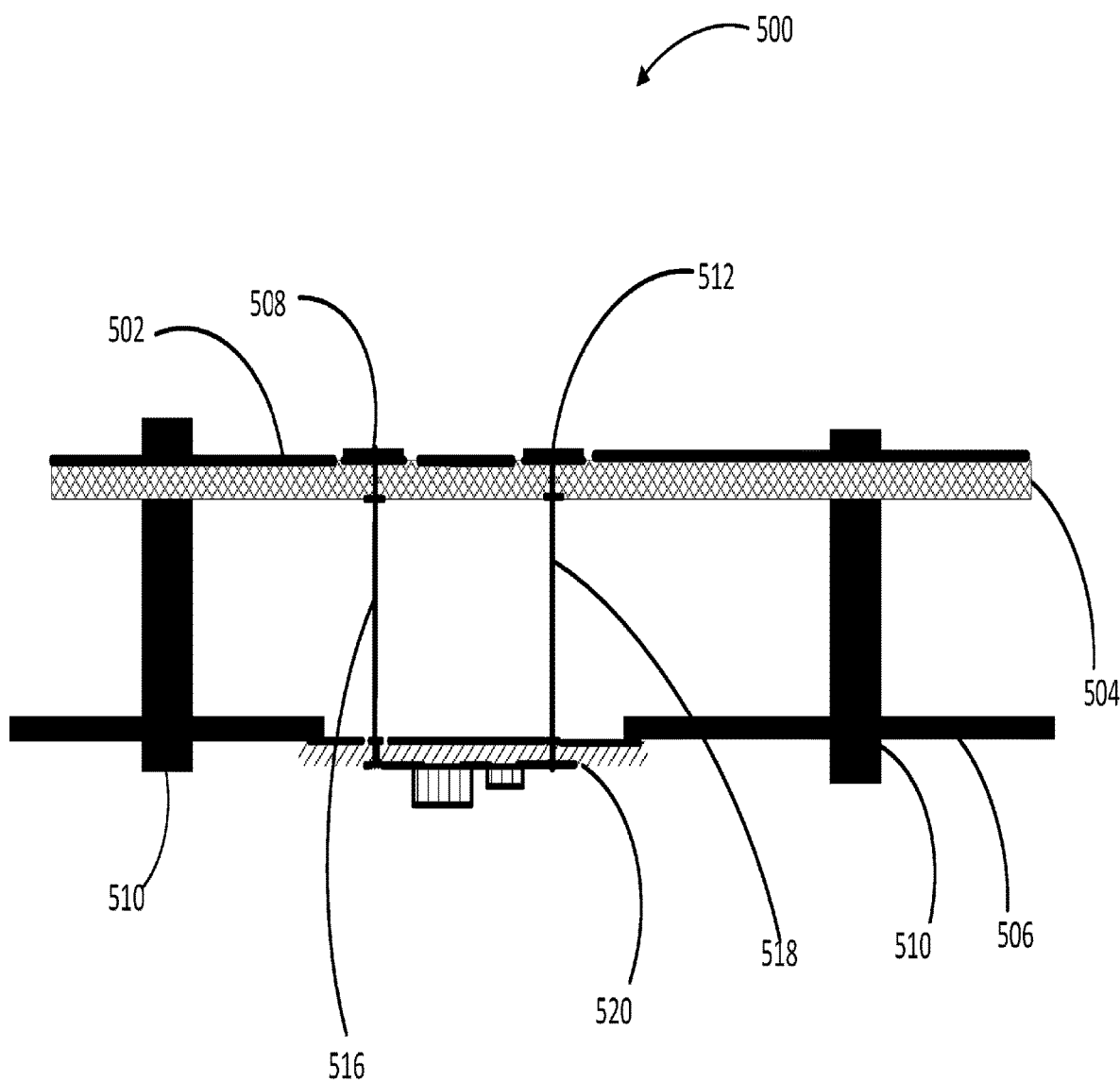
FIG. 6 shows a cut-away view of an exemplary zenith antenna assembly in accordance with the present invention.

With reference now to FIGS. 5 and 6, perspective and cutaway views of an exemplary zenith antenna assembly 500 are provided. As shown, an exemplary zenith patch antenna 502 may preferably be attached to a facet 506 of the present invention via non-conductive supports 510. As further shown, the zenith patch antenna 502 may preferably be attached to an insulating material 504 which may preferably be any dielectric material such as PCB substrate or the like. According to a further preferred embodiment, the patch antenna 502 is preferably formed of copper or other conducting materials. To partially control impedance matching, the zenith antenna assembly 500 preferably further includes one or more gap capacitors 508, 512 which are attached to one or more feed pins 516, 518. As further shown in FIG. 6, the feed pins 516, 518 are preferably further attached to the facet PCB 520. According to a further preferred embodiment, the top surface of the zenith antenna assembly 500 may include a raised or beveled edge. Further, the zenith patch antenna 502 may be recessed within the top surface of the zenith antenna assembly 500 to protect the patch antenna 502 and to reduce the profile of the antenna assembly 500.

Figure 7:
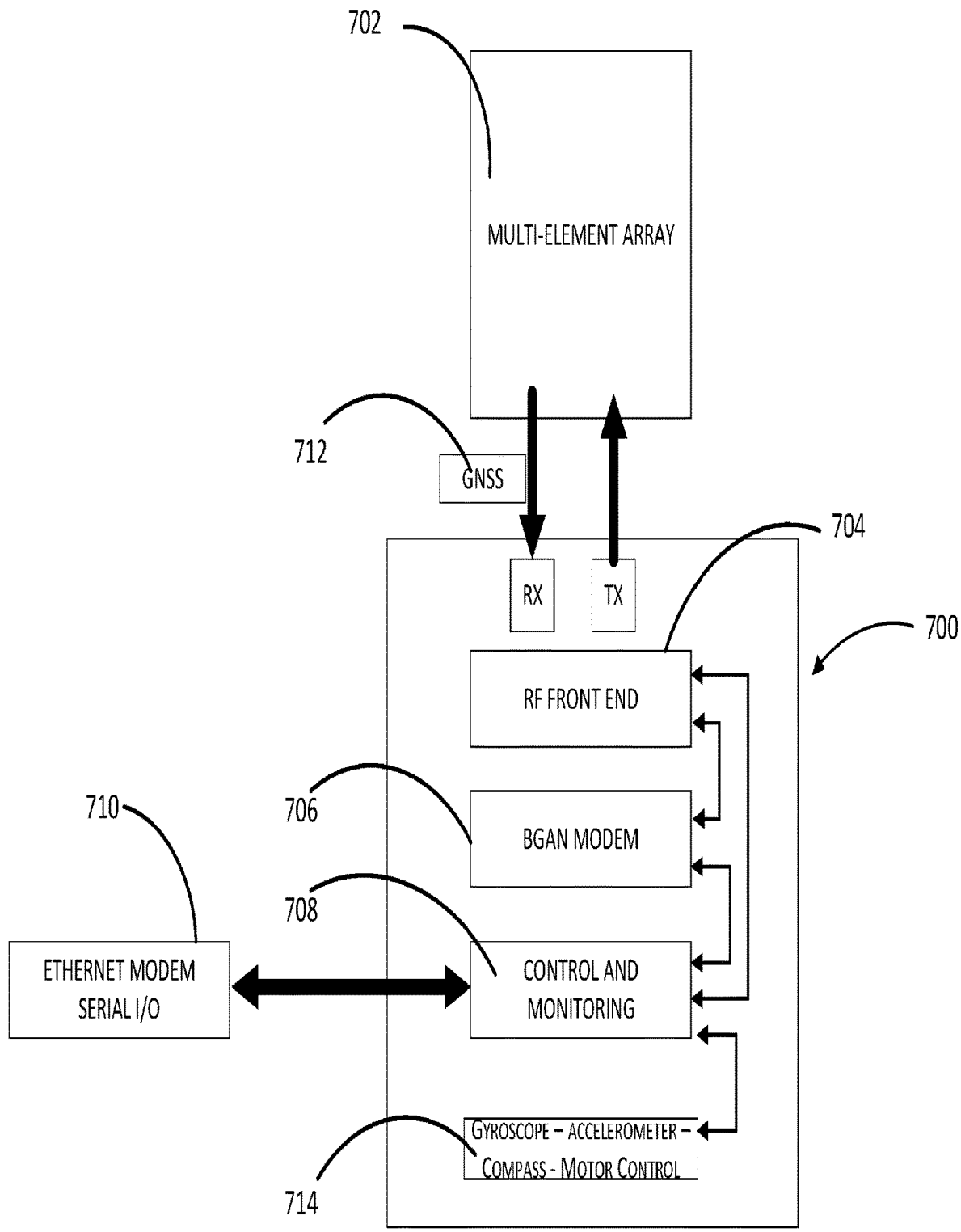
FIG. 7 is a high-level diagram illustrating an exemplary signal flow between an exemplary control module and an exemplary antenna array of the present invention.

With reference now to FIG. 7, a high-level diagram illustrating an exemplary signal flow between an exemplary control module 700 and the antenna array 702 of the present invention shall now be discussed. As shown, signals to and from the antenna array 702 (including GNSS 712 or optional GPS signals) are preferably processed through a RF Front End and Beam Forming Network 704 which controls the electrical transmission and reception characteristics of the antenna array 702 as discussed further below.

According to further preferred embodiments, the signals to and from the RF Front End module 704 may preferably be received by a BGAN Modem 706 and then fed to system controller(s) 708 which may further interface with outside processors and systems via an Ethernet modem and/or Universal Serial Bus (USB) connector 710. Further, the system controllers 708 may preferably further monitor the RSSI and other signal quality metrics from the BGAN Modem 706. Alternatively, the system may connect using any of a variety of I/Os and protocols such as serial connections, Bluetooth or the like. As further shown, the system controller(s) 708 may further receive input from auxiliary chips and sensors 714 including: gyroscopes, accelerometers, compasses and the like. According to a preferred embodiment, a gyroscope for example may be used to measure the angular velocity of the antenna. Further, the exemplary control module 700 may preferably further control the operation of the systems and methods of the present invention as discussed further below with respect to FIGS. 8-11

Figure 8:
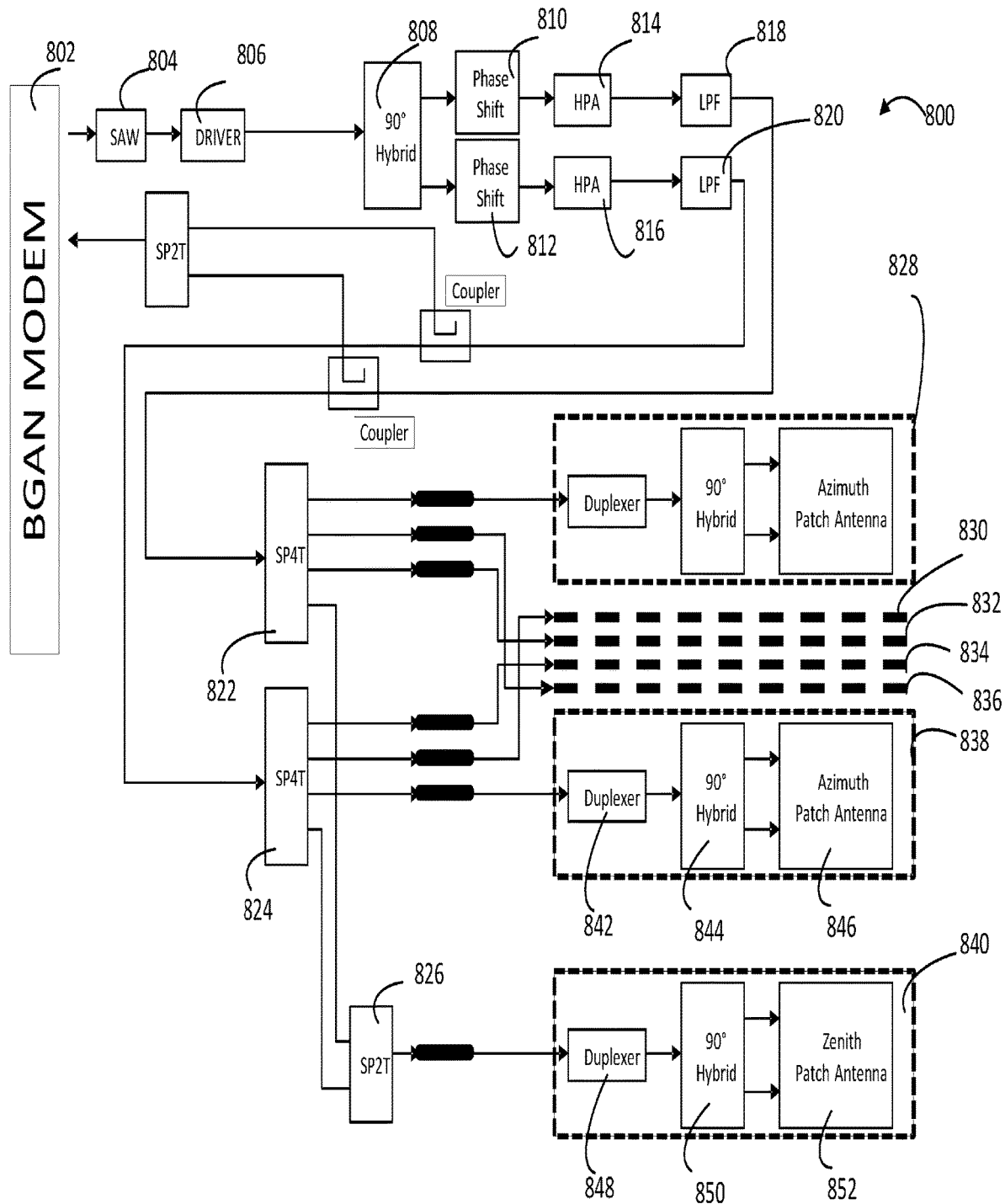
FIG. 8 is a circuit diagram illustrating an exemplary transmission circuit in accordance with aspects of the present invention.

FIG. 8 provides a simplified block diagram of an exemplary transmission circuit 800 in according with a further preferred embodiment of the present invention. As shown, the transmission circuit 800 includes a BGAN Modem 802 for outputting transmission signals to be transmitted/radiated by a combination of one or more patch antennas (i.e. the six azimuth patch antennas and the one zenith patch antenna). As shown, the circuit 800 first includes a SAW filter 804, a signal driver 806, a 90° hybrid coupler 808, and dual phase shifters 810, 812. While only a single-phase shifter would be required to provide the relative phasing required for beam steering, dual phase shifters 810, 812 allow signal phase continuity to be maintained during beam steering (i.e. producing the same net phase between signals), minimizing the impairments associated with phase jumps. As discussed further below, a pair of TX/RX antennas are preferably selected from an initial coarse signal search. Thereafter, a finer search is performed by phase shifting and steering the resulting beam produced by the selected antennas. According to a preferred embodiment, the selected antenna pairs may include either two adjacent azimuth antennas or an azimuth-zenith antenna pair As further shown in FIG. 8, the circuit 800 further includes high-power amplifiers (HPA) 814, 816, and low-pass filters (LPF) 818, 820. Thereafter, the two signals are directed to a pair of antenna cards (preferably two adjacent azimuth antennas or an azimuth-zenith antenna pair selected from among azimuth antenna cards 830-838 and zenith antenna card 840) via switches 822, 824, 826. As shown, each azimuth antenna card circuit preferably includes a duplexer 842, a 90° hybrid coupler 844 and an azimuth patch antenna 846. The zenith antenna card circuit preferably includes a duplexer 848, a 90° hybrid coupler 850 and a zenith patch antenna 852.

An important aspect of the present invention disclosed in FIG. 8 is the use of dual HPA's 814, 816 after the phase shifters 810, 812. In this configuration, each transmitting antenna path includes a dedicated HPA after which the signal is not combined, split or phase shifted prior to transmission. Accordingly, the knowledge of the phase of each signal is required for each respective phase shifter 810, 812 all the way through transmission. In this preferred configuration, the Effective Isotropic Radiated Power (EIRP) for each signal is combined in free space (i.e. after transmission from the pair of selected patch antennas) thus allowing for finer control and higher EIRPs for the combined signals. According to a further aspect of the present invention, each phase shifter 810, 812 is preferably controlled to calibrate out/compensate for the phase delays caused by the respective transmission paths of each signal prior to transmission. To achieved this, the present invention preferably further includes a look-up table which includes the calculated phase delays for each transmission path, for each antenna card and for each frequency. Accordingly, when a beam is chosen, the phase shifters 810, 812 are then controlled to impart the appropriate phase shift to each transmission signal based on the selected antenna cards and the selected RX/TX frequencies. Further, the switches for transmitting and receiving within the present invention are preferably independently controllable so that unique antenna pairs may be selected for transmitting and receiving in different directions as needed.

Figure 9:
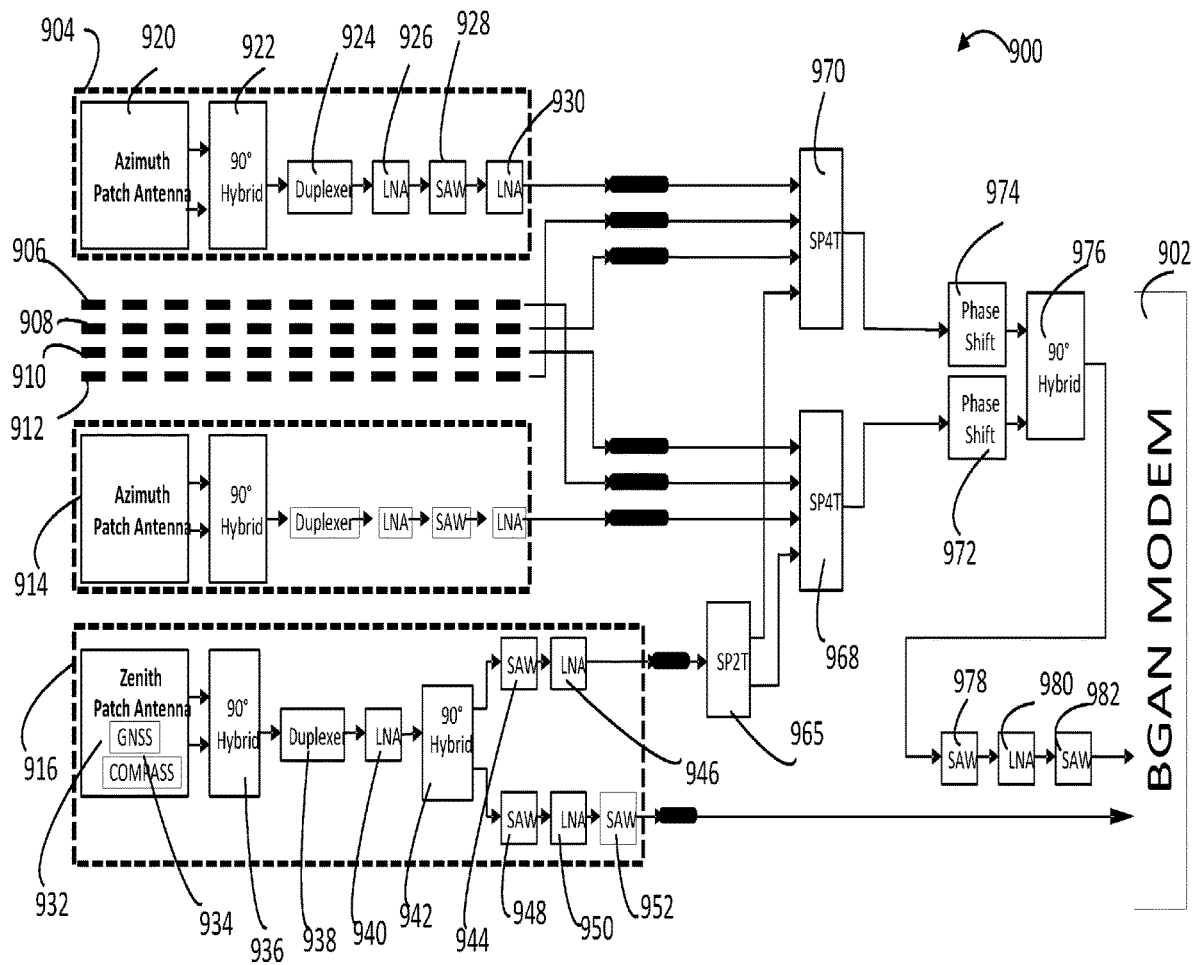
FIG. 9 is a circuit diagram illustrating an exemplary receiving circuit in accordance with aspects of the present invention.

With reference now to FIG. 9, a further block diagram describing an exemplary receiving circuit 900 in accordance with a further preferred embodiment is provided. Although the elements of the circuit 900 are distinctly numbered from those of FIG. 8, it should be understood that several circuit elements (i.e. antenna patches, diplexers etc.) may be shared between the two circuits 800, 900 and that they are distinctly numbered only for the purpose of explanation.

As shown, the exemplary receiving circuit 900 includes six azimuth antenna cards 904-914 and one zenith antenna card 916 for receiving satellite signals. As shown, each azimuth antenna card circuit (as shown in example card 904) preferably includes an azimuth patch antenna 920, a 90° hybrid coupler 922, a duplexer 924, a first LNA 926, a SAW filter 928, and a second LNA 930. To process the received signals, the zenith antenna card circuit 916 preferably further includes a first 90° hybrid coupler 936, a duplexer 938, a LNA 940, and a second 90° hybrid coupler 942. For the zenith patch antenna signals, the zenith antenna card 916 preferably further includes a SAW filter 944, and a second LNA 946.

For the GNSS signals, the zenith antenna card 916 preferably further includes a first SAW filter 948, a LNA 950 and a second SAW filter 952. Independent of the GNSS signals, the signals from the antenna cards 904-916 are transmitted to the GNSS receiver on the BGAN Modem 902 via switches 965, 968 and 970 and through a signal path which includes phase shifters 972, 974, a 90° hybrid coupler 976, a first SAW filter 978, a LNA 980 and a second SAW filter 982.

An important aspect of the present invention disclosed in FIG. 9 is the integration of LNAs 926, 930 within each antenna card. As shown, this allows for each received signal to be individually amplified prior to being combined or phase shifted thus preserving signal strength and quality. According to further preferred embodiments, the present invention is preferably configured to simultaneously and independently transmit and receive INMARSAT BGAN satellite signals using a multi-beam phased array system as discussed above. For both transmitting and receiving, the present invention preferably may store and access lookup tables for RF paths over given frequencies to assist in directing each beam. Analogously to the transmit phase shifters 810, 812, receive phase shifters 972, 974 align the phases of the two selected RF paths for forming the desired receive antenna patterns while avoiding phase jumps. Further, the system of the present invention may further employ broad beams to precisely locate satellites and thereafter produce an optimum finely tuned beam pattern for communicating with the selected satellites. As discussed above, the beam patterns may preferably be created from a single antenna card or preferably from a combination of two antenna cards and may include a combination of high and low elevation angle beams.

As discussed above with respect to FIG. 7, the RF Front End module 704 preferable may create a total of twelve BGAN beams from the six azimuth cards and one zenith card. Further, the system of the present invention may preferably further use a combination of phase shifters to precisely steer each beam as discussed above. According to further preferred embodiments, the phase applied by the phase shifters of the present invention may preferably be calibrated to optimize signal to noise ratios (SNR).

With reference again to FIGS. 2 and 3, an alternative embodiment of the present invention may further include a pedestal structure 103 which includes movable azimuth facets. In accordance with this alternative embodiment, the six azimuth antennas 102, 104, 106, 108, 110, 112 may first be inclined at a first angle which may be between 20 and 60 degrees. During operations, the system controllers may analyze signal quality and calculate an optimized angle of inclination for each azimuth antenna based on detected conditions. The system may then transmit a control signal to actuate control motors to increase or decrease the angle of inclination for each patch antenna which may be hinged. In this way, the system may move the focal point for each patch antenna and for the entire antenna array up or down in elevation to improve signal quality.

Figure 10:
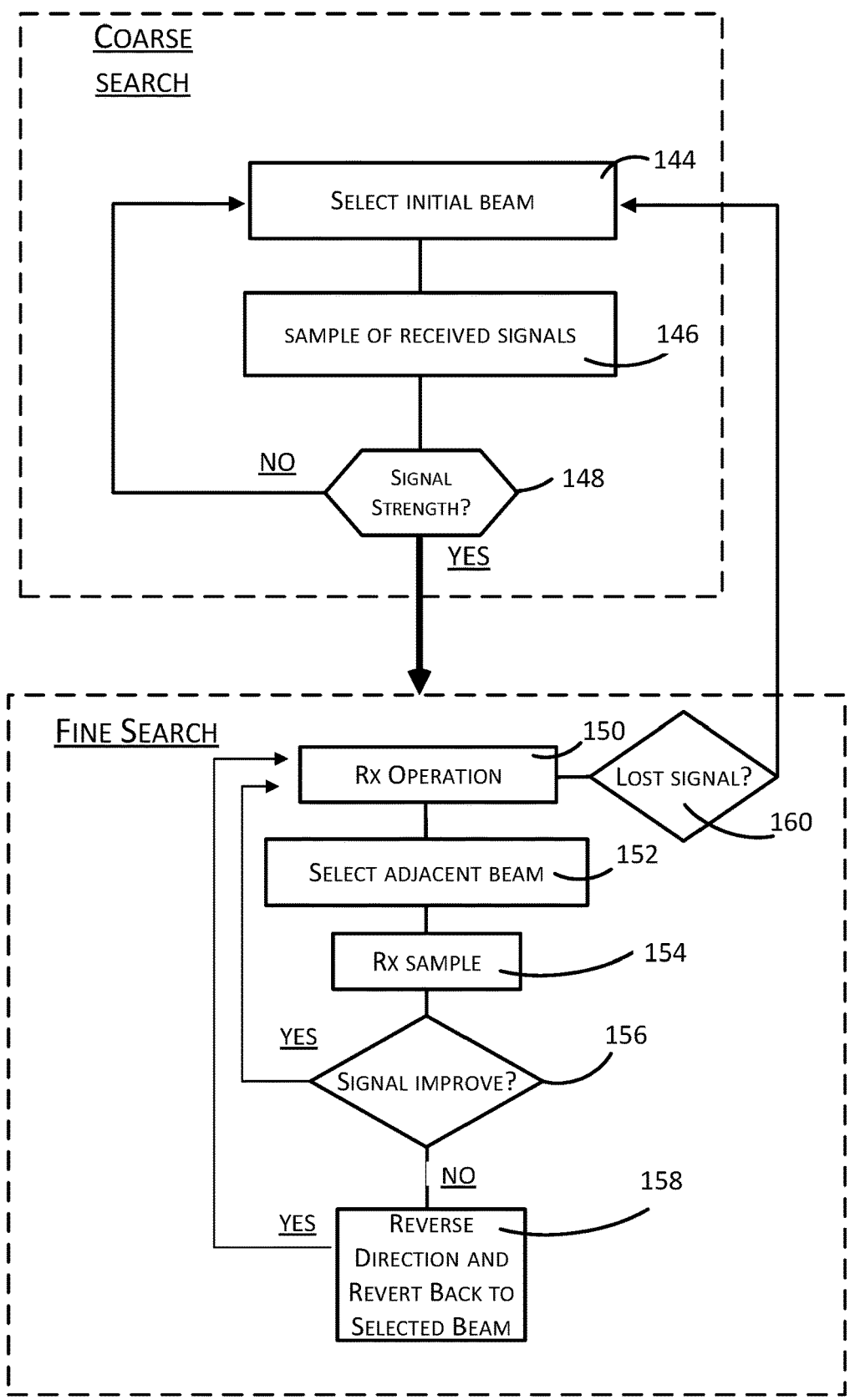
FIG. 10 is a diagram illustrating an exemplary method in accordance with aspects of the present invention.
Figure 11:
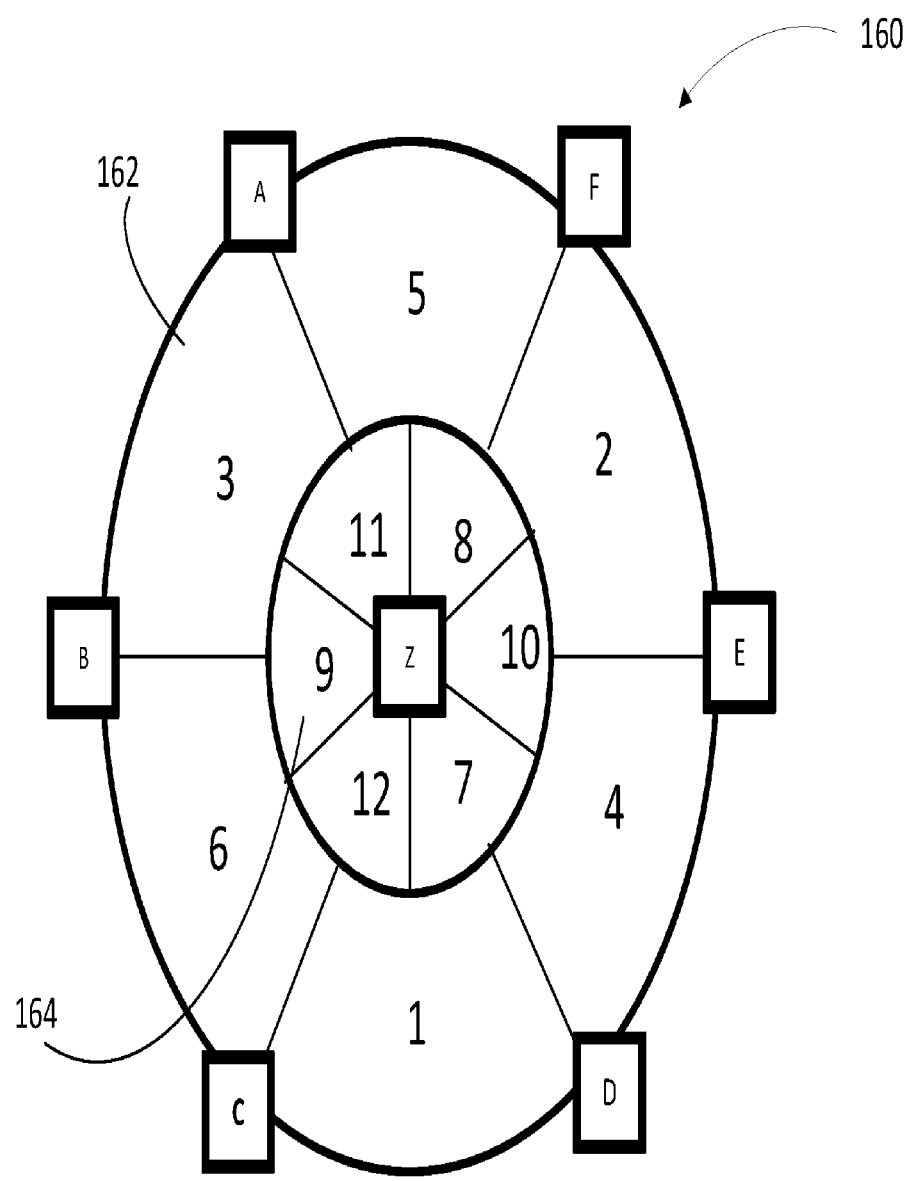
FIG. 11 is a high-level diagram illustrating exemplary beams created from the antenna patches of the present invention.

With reference now to FIGS. 10-11, an exemplary preferred method and algorithm of the present invention shall now be further discussed. As shown in FIG. 10, the method of the present invention is preferably divided into a first coarse beam selection followed by a fine beam steering algorithm. As discussed below, the system of the present invention preferably incorporates two mechanisms to create and adjust TX and RX beams. According to a preferred embodiment, the system of the present invention preferably first selects among antenna pairs to produce an initial beam preferably formed of one pair of antennas at a single-phase setting. Thereafter, upon confirming a signal, the system of the present invention steers the beam by providing the antenna pair feedpoints with the same signal at different phases, in order to shift the beam peak azimuth/elevation and to allow the resulting antenna signals to constructively spatially combine at a desired angle. Accordingly, as discussed further below, the combination of the two mechanisms of the present invention allow for delivery of multiple beams that span the full azimuth range.

With regards to the initial beam selection, FIG. 11 provides a diagram 160 of the six azimuth beams (1-6) and six zenith beams (beams 7-12) available for selection. Accordingly, the system of the present invention preferably selects the needed two antenna cards to produce any of the initial beams 1-12. Accordingly, if beam 3 (162) were selected, the system would produce beam 3 (162) with azimuth antennas A and B. Similarly, if beam 9 (164) were selected, the system would preferably produce beam 9 with the zenith antenna Z and azimuth antenna B.

According to a preferred embodiment, the system may preferably operate without any initial satellite location information. Accordingly, the system may sequentially scan for an initial RX signal starting at beam 1 and proceeding through beam 12 to identify an initial RX signal beam azimuth/elevation. Once an acceptable RX beam is identified, the system may then preferably proceed to a fine search for the optimal beam phasing. Preferably, the coarse beams have some minimal overlap to speed up signal acquisition. Further, the scanning sequence may be in order of the largest scanning angles to the smallest.

According to alternative preferred embodiments, the system of the present invention may be configured to work with a variety of satellite systems which may require additional data to quickly select an initial beam. Accordingly, a first step of the present invention may preferably further include retrieving initial location (i.e. GNSS), and/or inclination data for the antenna system. Based on the retrieved position/inclination data, a preferred system may preferably look up a stored satellite position for the detected time and select an initial antenna pair to produce an initial beam for the determined azimuth and elevation. According to a further preferred embodiment, the system of the present invention may further use additional optional inputs to further aid in initial beam selection. According to a further preferred embodiment, the optional inputs may include inputs such as: vessel speed/heading, gyroscopic data, accelerometer data, compass data, and/or the like.

With reference again to FIG. 10, at a first step 144 an initial beam is selected as discussed above. Thereafter, the system preferably then samples (step 146) and measures the strength of the RX signal against a predetermine threshold (step 148). If the signal strength is less than the threshold level, the system preferably returns to step 144 and selects a new antenna pair to produce a new beam. If the signal strength is above a threshold level, the system preferably then proceeds to perform a fine beam search as discussed further below.

As an exemplary first step in the fine beam search, the system may preferably first receive the given RX signal (step 150). Thereafter, the system may then preferably select an adjacent beam (step 152) and sample the resulting signal (step 154) to measure signal strength. At a next step 156, the system may then preferably determine whether the resulting signal strength has improved over the initial signal strength. As shown, if the signal has strengthened, the system then proceeds with RX operations (step 150) and continues to select adjacent beams (step 152) and sample signals (step 154). However, if the signal has weakened, then the system reverts back to the initially selected beam and the direction of the beam steering is preferably reversed (step 158).

Where a beam has been steered to its limit and still remains outside of an accepted range, the system may then continue fine beam steering with an adjacent antenna and transition between edge beams (i.e. switching the antenna pair and steering the new beam from the point nearest the former beam). Further, under certain conditions, the system may further revert back to coarse beam selection (step 160). For example, the system may reinitiate a coarse beam selection if: power is lost; the RX signal is lost; the heading changes; C/NO levels dip; or the like. Preferably, an enhanced threshold may be used to determine whether to switch beams and/or to revert back to the coarse beam selection in order to minimize beam switches.

Further, the fine beam tuning may be synchronized with optional inputs such as: vessel speed/heading, gyroscopic data, accelerometer data, compass data, GNSS data and/or the like. For example, if gyroscopic and heading data indicate a relative azimuth angle shift of 5°, the azimuth angle of the beam of the present invention may be shifted 5° and then sampled. Similarly, if the gyroscopic and accelerometer data indicate a relative elevation angle shift of 7°, the beam of the present invention may be shifted 7° in elevation angle and then sampled.

As discussed above, in each implementation of the present invention the beam pointing of the RX antenna may be independent from the beam pointing of the TX antenna. Accordingly, each of the antenna pairs (RX and TX) can be directed without interfering with the other pair and thus beam and phase changes can be minimized. According to an exemplary aspect of the present invention, a TX beam may preferably be switched only after being validated by an RX beam sample. Alternatively, the antenna pairs can follow each other and concurrently point in the same direction.

As referred to above, all communications of the present invention may be designed to be duplex or simplex in nature. Further, as needs require, the processes for transmitting data to and from the present invention may be designed to be push or pull in nature. Still further, each feature of the present invention may be made to be remotely activated and accessed from distant monitoring stations. Accordingly, data may preferably be uploaded to and downloaded from present invention as needed. For example, as detailed above, each system and subsystem of the present invention may be designed to send, receive, report and request information via the wireless and/or satellite systems to continually maintain and update the system.

While the above descriptions regarding the present invention contain much specificity, these should not be construed as limitations on the scope, but rather as examples. Many other variations are possible. Accordingly, the scope should be determined not by the embodiments illustrated, but by the appended claims and their legal equivalents.

What is claimed is:

1. An antenna system, wherein the system comprises:
a pedestal structure in the form of a hexagonal pyramid;
a first flat top facet;
a plurality of side facets, wherein each of the plurality of side facets supports a patch antenna assembly; and
a zenith antenna assembly; wherein the zenith antenna assembly is secured to the first flat top facet;
wherein at least one side patch antenna assembly comprises:
   a first elevating platform, wherein the first elevating platform is secured to a first side facet;
   an elevating platform, wherein the elevating platform comprises a plurality of vertical walls extending up from the first elevating platform;
   a first patch antenna;
   wherein the elevating platform comprises:
      a first support column, a second support column, a third support column, and a fourth support column;
      a first wall extending between the first support column and the second support column;
      a second wall extending between the second support column and the third support column;
      a third wall extending between the third support column and the fourth support column;
      a fourth wall extending between the fourth support column and the first support column;
   wherein each support column comprises a support extension;
   a first gap capacitor feed pin, wherein the first gap capacitor feed pin extends vertically from the first elevating platform; and
   a first gap capacitor, wherein the first gap capacitor comprises a first top plate attached to a top portion of the first gap capacitor feed pin; wherein the first top plate is vertically aligned and enclosed within a first surface of the first patch antenna;
wherein each patch antenna assembly is orientated 60 degrees from each adjacent patch antenna assembly;
wherein each side patch antenna assembly is offset from a ground plane by an angle between 20 and 60 degrees;
wherein the system comprises a first feed pin convexity; wherein the first feed convexity extends around a first feed pin.

2. The system of claim 1, wherein the first feed pin convexity is formed within the first, second, third or fourth walls.

3. The system of claim 2, wherein the system comprises a second feed pin convexity.

4. The system of claim 3, wherein the second feed convexity extends around a second feed pin.

5. The system of claim 4, wherein the second feed pin convexity is formed within the first, second, third or fourth walls.

6. The system of claim 1, wherein the system comprises a first feed pin convexity; wherein the first feed convexity extends around a first feed pin.

7. The system of claim 6, wherein the first feed pin convexity is formed within the first, second, third or fourth walls.

8. The system of claim 7, wherein the system comprises a second feed pin convexity.

9. The system of claim 8, wherein the second feed convexity extends around a second feed pin.

10. The system of claim 9, wherein the second feed pin convexity is formed within the first, second, third or fourth walls.

11. The system of claim 1, wherein the zenith antenna assembly is substantially parallel to the ground plane.

12. The system of claim 11, wherein the zenith antenna assembly comprises a GNSS antenna.

13. The system of claim 12, wherein the system comprises a second gap capacitor feed pin; wherein the second gap capacitor feed pin extends vertically from the first elevating platform.

14. The system of claim 13, wherein the system comprises a second gap capacitor; wherein the second gap capacitor comprises a second top plate attached to a top portion of the second gap capacitor feed pin.

15. The system of claim 14, wherein the second top plate is vertically aligned and enclosed within the first surface of the first patch antenna.

16. The system of claim 15, wherein each support extension extends from at least one of the support columns and into the first patch antenna.

17. The system of claim 16, wherein the system comprises a second gap capacitor feed pin; wherein the second gap capacitor feed pin extends vertically from the first elevating platform.

18. The system of claim 17, wherein the system comprises a second gap capacitor; wherein the second gap capacitor comprises a second top plate attached to a top portion of the second gap capacitor feed pin.

19. The system of claim 18, wherein the second top plate is vertically aligned and enclosed within the first surface of the first patch antenna.

* * * * *